United States Patent
Rodríguez et al.

(10) Patent No.: US 12,221,576 B2
(45) Date of Patent: Feb. 11, 2025

(54) FLAME-RETARDANT AND LATENT HARDENER COMPOSITION, A METHOD FOR MAKING FLAME-RETARDED WOOD AND CELLULOSE-FIBER BASED COMPOSITES AND BOARDS AND FLAME-RETARDED WOOD AND CELLULOSE-FIBER BASED BOARDS

(71) Applicant: BURNBLOCK HOLDING APS, Copenhagen (DK)

(72) Inventors: Mayra Melián Rodríguez, Holte (DK); Paw Christian Fælled, Copenhagen (DK)

(73) Assignee: BURNBLOCK HOLDING APS, København K (DK)

( * ) Notice: Subject to any disclaimer, the term of this patent is extended or adjusted under 35 U.S.C. 154(b) by 1020 days.

(21) Appl. No.: 17/054,582

(22) PCT Filed: May 8, 2019

(86) PCT No.: PCT/DK2019/050145
§ 371 (c)(1),
(2) Date: Nov. 11, 2020

(87) PCT Pub. No.: WO2019/214793
PCT Pub. Date: Nov. 14, 2019

(65) Prior Publication Data
US 2021/0189245 A1    Jun. 24, 2021

(30) Foreign Application Priority Data

May 11, 2018   (DK) .......................... PA 2018 70288

(51) Int. Cl.
*C09K 21/04*       (2006.01)
*B27K 3/16*        (2006.01)
(Continued)

(52) U.S. Cl.
CPC .............. *C09K 21/04* (2013.01); *B27K 3/166* (2013.01); *B27N 1/02* (2013.01); *B27N 3/002* (2013.01);
(Continued)

(58) Field of Classification Search
CPC ........................... B27K 3/166; B27K 2240/30
See application file for complete search history.

(56) References Cited

U.S. PATENT DOCUMENTS

| | | | |
|---|---|---|---|
| 3,498,877 A | 3/1970 | Christen et al. | |
| 4,038,451 A | 7/1977 | Brown et al. | |

(Continued)

FOREIGN PATENT DOCUMENTS

| | | |
|---|---|---|
| CN | 103627293 A | 3/2014 |
| CN | 103710032 A | 4/2014 |

(Continued)

OTHER PUBLICATIONS

American National Standard: Medium Density Fiberboard (MDF) for Interior Applications, ANSI A208.Feb. 2002. (Year: 2002).*

(Continued)

*Primary Examiner* — Peter F Godenschwager
(74) *Attorney, Agent, or Firm* — Schmeiser, Olsen & Watts LLP

(57) ABSTRACT

Provided is a flame retardant and latent hardener composition including a blend of 30-100% (by weight based on total solids) of diammonium hydrogen phosphate, and dihydrogen phosphate, 0-50% (by weight based on total solids) of monoammonium. The flame-retardant/hardener composition is prepared as a solid blend or a liquid composition, the liquid composition being an aqueous composition including a liquid aqueous solution of the contents ranging from 25% w/w to 80% w/w. Methods for making flame retarded fiber boards using the composition as flame retarder and a hard- (Continued)

Figure 1:
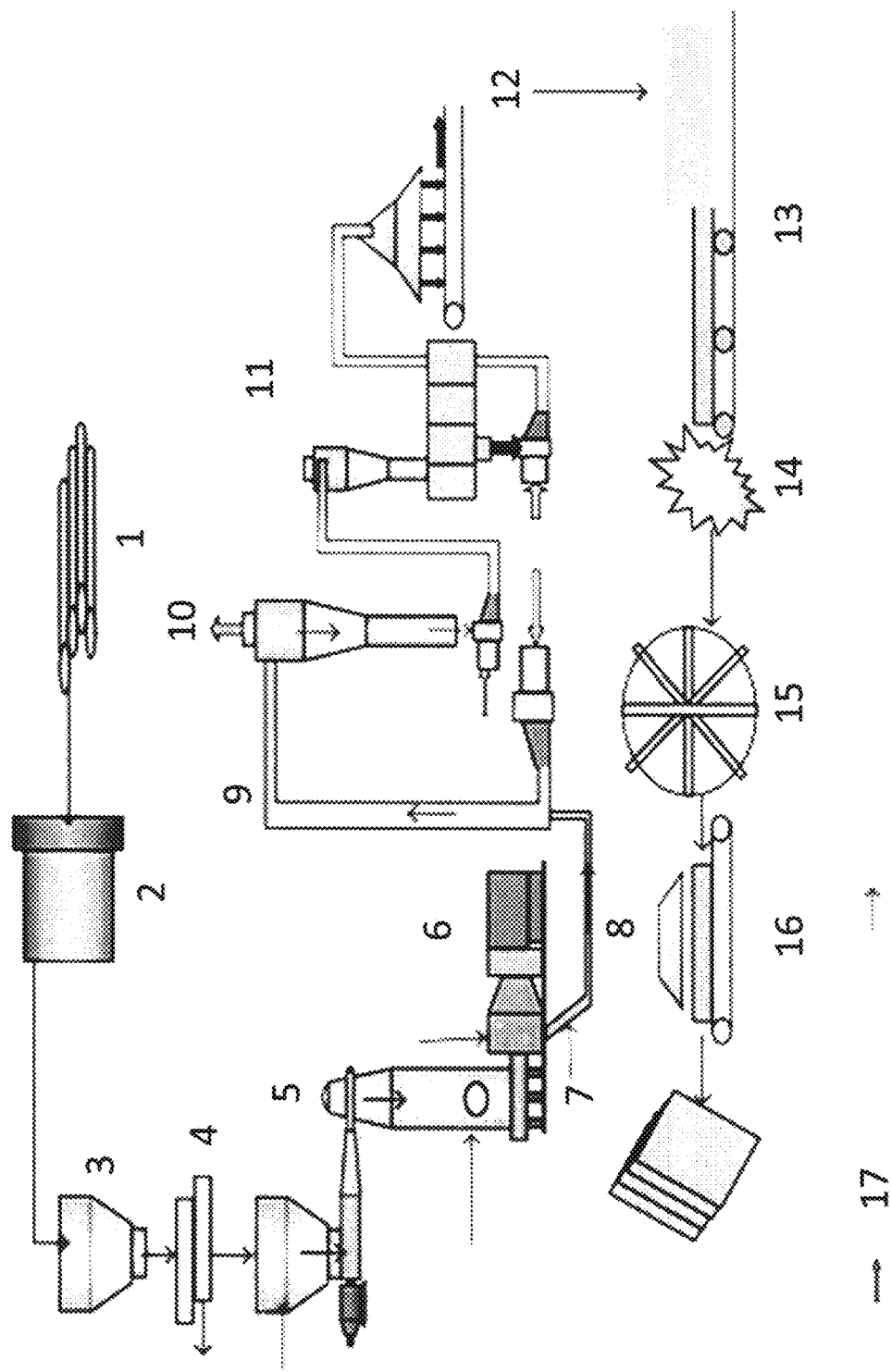

ener for the resin used in the production of the boards are also provided.

6 Claims, 3 Drawing Sheets

(51) Int. Cl.
  B27N 1/02      (2006.01)
  B27N 3/00      (2006.01)
  B27N 3/02      (2006.01)
  B27N 3/04      (2006.01)
  B27N 7/00      (2006.01)

(52) U.S. Cl.
  CPC ............... *B27N 3/02* (2013.01); *B27N 3/04* (2013.01); *B27N 7/00* (2013.01); *B27K 2200/15* (2013.01); *B27K 2240/30* (2013.01)

(56) References Cited

U.S. PATENT DOCUMENTS

| | | | |
|---|---|---|---|
| 4,725,382 | A | 2/1988 | Lewchalermwong |
| 7,736,549 | B2 | 6/2010 | Griem |
| 2002/0115774 | A1 | 8/2002 | Afiouni |
| 2004/0251446 | A1* | 12/2004 | Mantanis ............... C09K 21/10 252/8.05 |
| 2013/0280432 | A1 | 10/2013 | Johnson et al. |
| 2014/0093742 | A1 | 4/2014 | Saari |
| 2017/0120473 | A1 | 5/2017 | Zhang et al. |

FOREIGN PATENT DOCUMENTS

| | | |
|---|---|---|
| KR | 20170127900 | 11/2017 |
| RU | 2 553 644 C1 | 6/2015 |
| WO | 9600763 A1 | 1/1996 |
| WO | 02/102926 A1 | 12/2002 |

OTHER PUBLICATIONS

Kamal et al "Water Absorption and Curing Time Performance of Urea Formaldehyde resin Mixed With Different Amount of Phosphorous-Based Fire Retardants" Journal of Borneo Science, 2008, 23, 75-80. (Year: 2008).*

International Search Report for PCT/DK2019/050145 issued Sep. 9, 2019.

Written Opinion for PCT/DK2019/050145 issued Sep. 9, 2019.

Gervais, Claire et al: Cleaning Marble With Ammonium Citrate; Studies in Conservation 55 (2010); pp. 167-176.

Danish Search Report for Application PA 2018 70288 issued Nov. 14, 2018.

Borysiuk P. et al.: "Flammability of plywood made from veneers protected with flame retardant based on diammonium hydrogen phosphate, citric acid and sodium benzoate", Annals of Warsaw University of Life Science, 2011, No. 73, pp. 167-171. See pp. 167-168, paragraph: Materials and methods ink for one time download: http://www.reprintdesk.com/landing/dl.aspx?o=5610280&r=706830345.

* cited by examiner

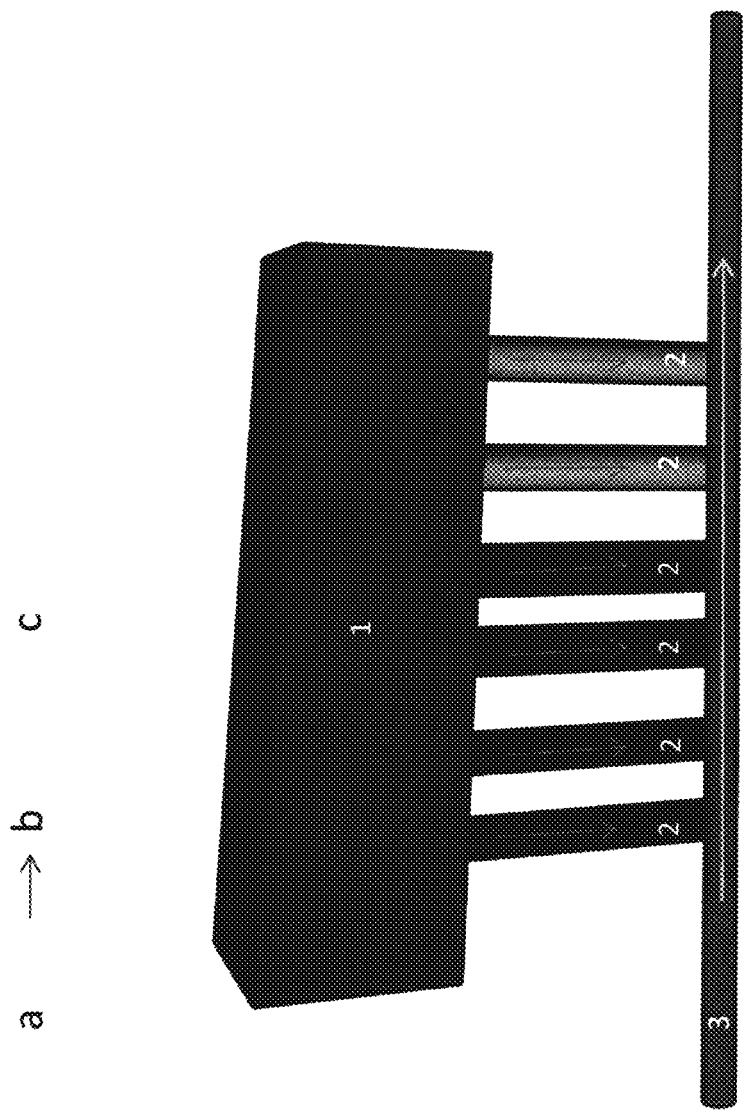

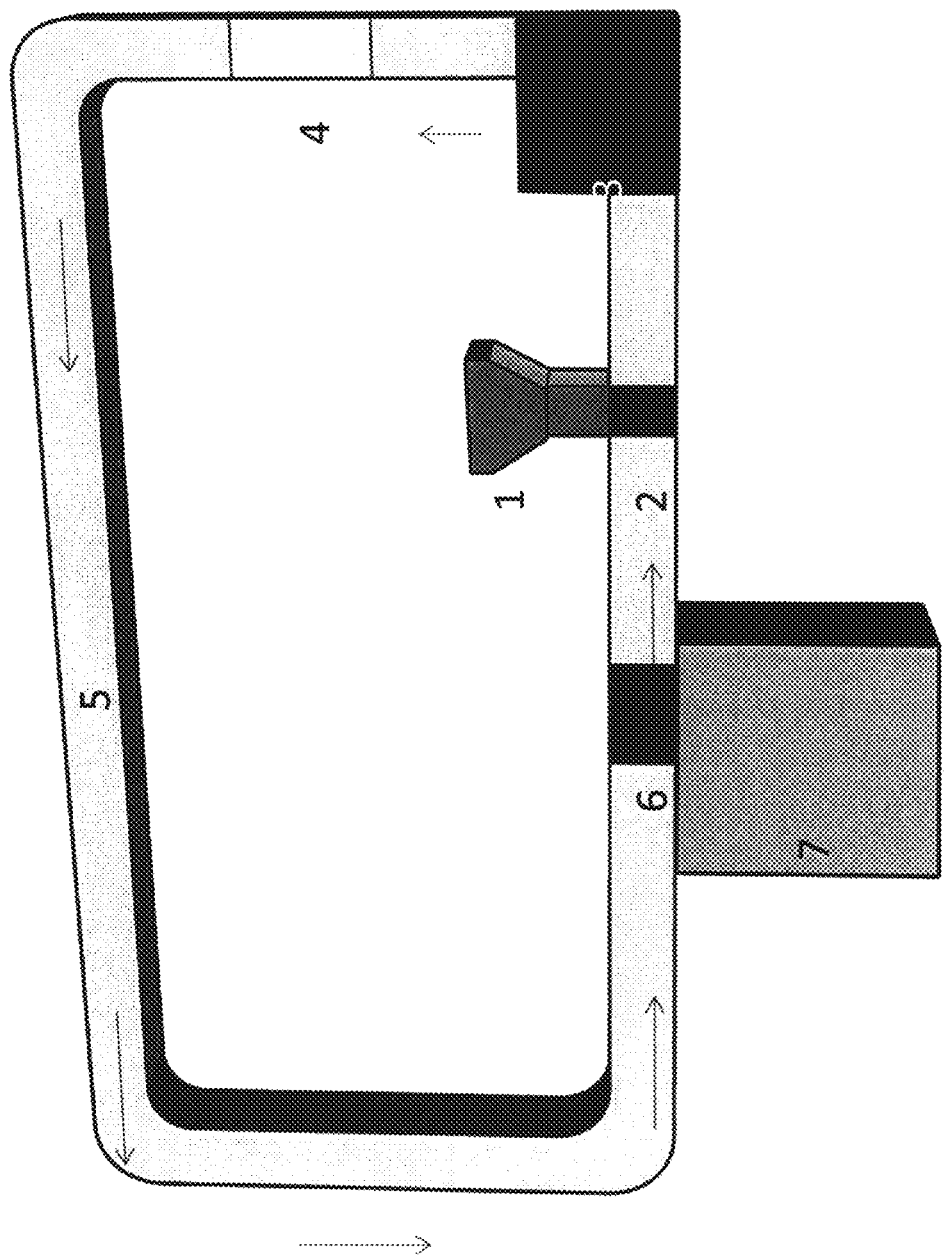

FLAME-RETARDANT AND LATENT HARDENER COMPOSITION, A METHOD FOR MAKING FLAME-RETARDED WOOD AND CELLULOSE-FIBER BASED COMPOSITES AND BOARDS AND FLAME-RETARDED WOOD AND CELLULOSE-FIBER BASED BOARDS

CROSS-REFERENCE TO RELATED APPLICATIONS

This application claims priority to PCT Application No. PCT/DK2019/050145, having a filing date of May 8, 2019, which is based DK Application No. PA 2018 70288, having a filing date of May 11, 2018, the entire contents both of which are hereby incorporated by reference.

FIELD OF TECHNOLOGY

The following relates to a flame retardant and latent hardener composition suited for use in wood and cellulose-fiber based composites and boards.

The following also relates to a method for producing wood-based composite boards, such as fiber boards, particle board, plywood, orientated strand board, oriented structural strand boards, waferboard and wet process fiberboards which contain the flame retardant composition.

The following also relates to use of a flame retardant and latent hardener composition. More specifically, it utilizes a water-soluble, non-toxic, and environmentally benign, flame retardant formulation as a combined flame retardant and latent hardener for the binders in the above-mentioned boards.

BACKGROUND

There is a drive from consumers, legislators and, consequentially, producers, to impart improved fire retardance to wood based composite products used in construction, furniture and other areas utilising such products. Wood-based composite boards types used in the built environment are often particle boards (PB), Low Density Fibers (LDF) Medium Density Fiberboard (MDF), High Density Fiberboards (HDF), Oriented Strand Board (OSB), flakeboard, sterling board, Aspenite, oriented structural straw boards, quartboard, isorel, karlit, treatex, torex, pressboard, waferboard, wet process fiberboard, melamine faced chipboards with plywood being also common. All the different composition, density of this kind of boards are further mentioned as fiber boards or particle boards. Importantly, the applied flame-retardants should be non-toxic to humans and the environment, especially but not only in indoor environment.

The particulate or fiberous wood element components which constitute the major mass of the boards are often bonded together, in the final composite product, using one of the commonly used formaldehyde cross-linked resin binders such as Urea Formaldehyde (UF), Melamine Formaldehyde (MF), Melamine Urea Formaldehyde (MUF), Melamine Urea Phenol Formaldehyde (MUPF), and known variants of these, in which final cross-linking of the binder, and thereby bonding of the panel, is catalysed using a latent-acid hardener during hot-pressing. In such panels, approaches to flame retarding have mainly to date been based on addition of traditional flame retardant materials to the boards after finishing production thereof. Examples traditionally are Aluminium Hydroxide, Magnesium Hydroxide, Borate salts, other chemicals e.g. halogens. Harmful fire-resistant compositions include those that are halogenated, particularly those with chlorine and bromine. Bromine flame retardants (BFRs) and Chlorinated flame retardants (CFRs) have been used for over 30 years and BRF's in particular have been linked to major health threats. Borate salts are also now regarded as harmful to the environment and are being phased out, at least in the EU/Europe. The Hydroxides mentioned are difficult to apply evenly throughout a board and have limited efficacy in obtaining flame retardant boards.

There is hence a need for effective, non-toxic and environmentally benign flame retardant formulations which can be applied to wood-based boards, such that distribution is even throughout the board, and which can be added directly during the board production process, resulting in higher performance fire/flame resistant boards. In addition, full or partial replacement of one or more of other additives needed for composite production by a flame-retardant formulation would be of further benefit, in order to simplify the overall additive profile and reduce input amounts and costs.

Embodiments of the present invention address this and demonstrate effective formulations, processing steps, and products resulting from the novel approach.

CN20131564804A, also published as CN103627293 reveals a flame-retardant composite urea resin suitable for particle-board in which complex and substantial modification of the resin is performed, involving addition of oxidized starch, polyvinyl alcohol as a toughening agent, hydrogenated rosin as an antioxidant, polyisocyanate as a curing agent, isobutyl triethoxy silane as a bridging agent, phenolated lignin as a formaldehyde catcher. This is an approach that is likely not easily integrated to large scale board production.

Whereas US2002115774(A1) teaches that wood particles intended for use in composite panels can be pre-treated ("impregnated") with ammonium phosphates and metal hydroxides, then dried and the treated particles mixed with modified glue binder (mix of Urea-formaldehyde and phenolic resin) and the mix hot-pressed to a fire-resistant panel. The pre-treatment step in particular represents a significant and time-consuming addition to current manufacturing practice for Particle board.

CN103710032 (A) describes a flame retardant "composition" comprising magnesium chloride, phosphoric acid, ammonium phosphates, and a water-borne adhesive. The adhesive type is not specified, nor is method of production or application area.

U.S. Pat. No. 7,736,549 (B2) informs on a general, water-soluble, environmentally friendly, and non-toxic flame-retardant formulation which is composed of a mixture of Phosphate salts, including ammonium phosphates, Citric acid, and a preservative salt. This is a formulation intended for application to a number of finished substrates, including textiles and wood products, either as an aqueous solution of the components, or alternatively, where appropriate, as a powder blend.

KR 20170127900A describes a flame-retardant composition of diammonium hydrogen phosphate (DAP), water and a condensate of a urea-formaldehyde resin, which is used for flame proofing wood fiber boards e.g. MDF boards.

BORYSIUK P. et al.: "Flammability of plywood made from veneers protected with flame retardant based on diammonium hydrogen phosphate, citric acid and sodium benzoate" (ANNALS OF WARSAW UNIVERSITY OF LIFE SCIENCE, 2011, No. 73, pages 167-171) describes that plywood/veneers of birch of pine is made by gluing the layered material together with an urea formaldehyde resin using ammonium sulphate as hardener for the resin. The flame retardant is based on DAP with citric acid and sodium benzoate. Ratios between these components are not mentioned. The flame retardant is then impregnated on the plywood plates after finalizing production thereof. Thus, the flame-retardant composition used does not provide any hardener effects on the produced plywood boards.

WO 96/00763A describes a flame-retardant composition for impregnating on items, including wood-based materials. The impregnating aqueous solution contains DAP and/or monoammonium dihydrogen phosphate (MAP), phosphoric acid, acetic acid, and metal salts able to form insoluble phosphate of ammonium phosphate salts. The use as MUF resin hardener during production of MDF fiber boards is not described.

US 2013/0280432A describes a flame-retardant composition which is applied to cellulosic material (cotton twill cloths in examples) and cured (i.e. the cloth is dried in example 4). Example 4 cited by the examiner uses a DAP containing flame retardant made from a mixture of phosphoric acid, ammonium hydroxide and urea. There is no disclosure of the flame retardant also working as a hardener for resins, in particular MUF resins, in the production of fiber boards.

The following is a significant step-forward in technology enabling the cost-effective and efficient production of environmentally benign, non-toxic, and higher performance fire resistant wood-based composite boards.

In the now universally accepted best manufacturing practice for production of LDF, MDF and HDF boards, the following steps are carried out converting raw wood logs into an LDF, MDF and HDF board product:

Wood logs are debarked and then converted into chips mechanically. The chips are then screw transported (via a chip hopper) into a digestion vessel and steamed for 30-120 seconds before being fed into a defibrator, which maintains a high pressure and temperature (typically around 8 bars, 180° C. while grinding the wood chips into a pulp. The pulp is released from refiner via a tube called the "blowline" into a drier. Because of the pressure drop from circa 8 bars to atmospheric pressure on release into the blowline, the pulp moves at high speed with very turbulent flow in the blowline, facilitating mixing of components. The blowline is hence a key component of the LDF, MDF and HDF board production line, and is fitted with a number of injection points/nozzles which can introduce additives and liquid (water-based) resin binder into the turbulent mass of fibers ejected from the refiner. From the blowline, the fibers enter an expansion chamber and then a flash drier, in which the fiber mass and additives rapidly dry, wherein moisture contents at drier exit are is typically 8-12%. The dried mass enters a mat-former, after which the mat is pre-compressed and either sent straight to a continuous hot pressor cut into large sheets) for a multi-opening hot press former. The resin binder is cured during hot-pressing, catalysed by the thermal activation of the latent acid hardener.

In the blowline, in addition to resin binder, other additives such as wax-emulsion, and a latent hardener are often added via injection. It would be advantageous to add a water-borne flame-retardant formulation to the fiber mass in the blowline, which also functions as latent hardener, whilst retaining its fire-retarding properties in the finished board. This is one of the focal points of embodiments of the present invention.

Particle board production is carried out at high scale, typically in plants processing upwards of 150,000 metric tons per annum. The steps involved in the PB process can be described as follows. Wood is debarked and then mechanically chipped. The chips are dried, e.g. to a moisture contents around 10% and then sieved into specific size fractions, for later recombination in a layered mat prior to pre-pressing. The dried chips are added into resin blenders, in which either liquid resin binder is added through spray nozzles, alongside other additives/latent hardener, wax-emulsion, etc.) or a powder glue formulation is mixed with the dried chips. The prepared chips are sent to a mat-former, and after to a pre-press, before final hot-pressing effecting final glue curing.

As with LDF, MDF and HDF board production, the addition of a water-borne or even a solid, powder base, flame retardant formulation, which also functions as latent hardener, whilst retaining its fire-retarding properties in the finished board, would be a progressive development for the industry.

For the board product type Oriented Strandboard ("OSB"), the production sequence is similar to that for PB. Wood is debarked and then fed into a "Strander" which uses knives to create wood strands. The strands are then paced in a rotary drier, and the semi-dried strands are then sprayed or mixed with liquid resin and other additives, or blended with solid resin and additives. The resinated strands are then oriented by feeding to a continuous belt, and sections are hot-pressed to produce the OSB product. As with other board products, the addition of a water-borne or even a solid, powder base, flame retardant formulation, which also functions as latent hardener, whilst retaining its fire-retarding properties in the finished board, would be a progressive development for the industry.

SUMMARY

An aspect relates to providing a non-toxic and environmentally benign flame-retardant formulations and uses thereof.

An aspect is also to provide non-toxic and environmentally benign flame retardant and latent hardener formulations which can be applied to wood-based boards during production of the boards.

An aspect of embodiments of the present invention is also to provide a method for producing wood-based boards resulting in higher performance fire/flame resistant boards.

In addition, an aspect of embodiments of the present invention is also to provide full or partial replacement of one or more of other additives needed for wood based composite boards production by a flame-retardant formulation.

In addition, an aspect of embodiments of the present invention is also to provide for wood based composite boards and production methods thereof which are simplified and/or where the overall additive profile is reduced in relation to number of additives and/or amounts, and/or where costs are reduced.

In addition, an aspect of embodiments of the present invention is also to provide for wood based composite boards and production methods thereof where costs are reduced.

These aspects may be obtained by a flame retardant and latent hardener composition comprising a blend of 30-100% (by weight based on total solids) of diammonium hydrogen phosphate (DAP), and 0-50% (by weight based on total solids) of monoammonium dihydrogen phosphate (MAP), and where the ratio of DAP to MAP ranges from 95% DAP/5% MAP to 60 DAP/40% MAP, and which flame retardant composition is prepared as a solid blend or a liquid composition, the liquid composition being an aqueous composition comprising a liquid aqueous solution of the contents ranging from 25% w/w to 80% w/w of the blend.

Hereby is obtained a high concentrate flame retardant that also acts as a latent hardener. The latent hardener and flame retardant does not compromise the construction of fiber and particle boards due to its high concentration of solid content and its low water content.

The flame retardant and latent hardener composition may comprise blends of DAP and MAP (in ratios) ranges from 90% DAP/10% MAP to 70% DAP/30% MAP, for example in the range 85% DAP/15% MAP to 75% DAP/25% MAP.

Hereby is obtained an effective, non-toxic, and environmentally benign flame retardant and latent hardener formulation, which can be applied to wood-based boards.

The flame retardant and latent hardener composition may further comprise from 0.1 up to 15% (by weight of total solids), for example in the range 1.5-5% ratio (on a solids basis) of one or more organic acids selected from the group consisting of $C_2$-$C_7$ organic acid, such as citric acid, formic acid, acetic acid, malic acid, tartaric acid, oxalic acid, lactic acid, butyric acid, or strong acids such as hydrochloric acid the mixtures thereof. Citric Acid may be a preferred one in embodiments.

Hereby is obtained an acidic material to regulate the pH level of embodiments of the invention, enhancing the properties of the phosphate source. The pH of the composition can vary in a range of about 5 to 9, for example about 6 to 7 in some embodiments. The pH can also be adjusted through the use of appropriate phosphate salts, or by addition of strong acids such HCl, or strong bases such as NaOH or CaOH.

The flame retardant and latent hardener composition further comprises 10-90% (by weight of total solids), for example, 30-50% in some embodiments, of one or more monobasic or dibasic sodium and/or potassium phosphates, or mixtures thereof.

Hereby is obtained an effective, non-toxic, and environmentally benign flame retardant and latent hardening formulation, and in addition to also hardening the resin component the composition also provides potential reduction in the ammonia emission on the later fire retarded boards.

The flame retardant and latent hardener composition may further comprise from 0.1 up to 10%, for example in the range 2-6% (by weight based on a solids basis) of one or more additives, for example selected from sodium benzoate, potassium benzoate, sodium sorbate, potassium sorbate, sodium salicylate, potassium salicylate and/or mixtures thereof, as well as Allura red, carmine, and other colorants and/or mixtures thereof. These additives are added as preservative in order to prevent growth of bacteria or mold during the transport, storage and use of the fire-retardant composition. There is also optionally a colorant additive (dye) to help in the identification of a fire-retardant product. Hereby a shelf-stable formulation is obtained when presented in an aqueous solution form.

Aspects of embodiments of the present invention are also met by a method for fireproofing or flameproofing LDF, MDF and HDF boards, during production of the boards, in which wood fibers or wood particles are passed from a storage and to a press, for example, a hot press, via a blow line, and wherein a binder is added to the wood fibers or wood particles by mixing the binder into the fiber or particles by injecting the binder into the blow line and subsequently pressing the blend in a press to obtain the final wood composite board, and wherein the method further comprises adding a flame retardant composition to the wood fibers or wood particles, by a. injecting a liquid aqueous flame retardant and latent hardener composition to a blow line that passes the wood fibers or wood particles from a storage and to a press, and where the liquid aqueous flame retardant composition is added to the blow line in parallel to the binder, or b. adding a solid blend of the flame-retardant composition to the wood fibers or wood particles in an intermediate mixing step provided between the refiner and the forming and hot-pressing steps in board production.

Aspects of embodiments of the present invention are also met by a method for fireproofing or flameproofing PB, OSB boards, during production of the boards, in which wood particles or strands are passed from a storage and to a press, for example, a hot press, via a resin mixing or blending chamber, which can be a resin blending section at the end of a rotary drier, and wherein a binder is added to the wood particles by mixing the binder into the particles or particles by injecting the binder and subsequently pressing the blend in a press to obtain the final wood composite board, and wherein the method further comprises adding a flame retardant composition to the wood fibers or wood particles, by a. injecting a liquid aqueous flame retardant and latent hardener composition into the resin blender or resin blending section of a drier that passes the wood fibers or wood particles from a storage and to a press, and where the liquid aqueous flame retardant and latent hardener composition is added in parallel to the binder, or b. adding a solid blend of the flame retardant and latent hardener composition to the wood fibers or wood particles in an intermediate mixing step provided between the refiner and the forming and hot-pressing steps in board production.

In embodiments of the method, the binder used in the board may be made with a thermosetting resin binder, that is cured by an acid catalyst, and wherein the thermosetting resin may comprise a formaldehyde cross-linked resin binder such as Urea Formaldehyde (UF), Melamine Formaldehyde (MF), Melamine Urea Formaldehyde (MUF), Melamine Urea Phenol Formaldehyde (MUPF) or mixtures thereof and where the mix of resin and wood fibers or wood particles are cured in a hot-press.

An embodiment of the method may also be special in that the (latent) acid catalyst is provided by the flame-retardant composition.

Hereby is obtained a new use of the retardant system, acting as a latent hardening catalyst, and allowing the curing of the board in the hot-press after the addition of the glue.

The flame retardant and latent hardener composition may be added to the wood fibers or particles in an amount corresponding to from 15 kg per $m^3$ of finished product up to 100 $kg/m^3$, for example, in the range from 25 $kg/m^3$ to 75 $kg/m^3$.

Hereby is obtained a wood composite board with improved characteristics that allow a higher classification in fire resistance. In addition, when adding the fire retardant and latent hardener composition, cost is reduced because of elimination/replacement of other more expensive hardeners conventionally added during the production of the fiber or particle boards or OSB boards.

In parallel to this method, it is also possible to obtain these advantages when producing boards comprising other materials as well. This includes a method for fireproofing or flameproofing boards made with organic material/materials, fibers or particles, such as wood fibers, wood particles, wood strands, plant particles or material such as seeds, husks, straw, shells of nuts or seeds or mixtures thereof or glued boards comprising one or more layers of textiles or textile fibers, or resin boards comprising a resin matrix with dispersed fibers and/or particles of wood fibers, wood chips, wood strands, one or more layers of textiles, textile fibers, plant particles such as seeds, husks, shells of nuts or seeds and/or mixtures thereof, wherein a fireproofing or flameproofing composition is induced to the organic material during production of the boards, in which organic material is passed from a storage and to a board forming station, such as a press, for example a hot press, via a resin mixing or blending chamber, which can be a resin blending section at the end of a rotary drier, and wherein a binder or a matrix forming resin is added to the organic material by mixing the binder or resin into the organic material by injecting the binder or resin and subsequently forming the blend into boards, such as in a press, to obtain the final composite board containing the organic material, and wherein the method further comprises adding a flame retardant composition to the organic material, by a. injecting a liquid aqueous flame retardant and latent hardener composition into the organic material and where the liquid aqueous flame retardant and latent hardener composition is added prior to and/or in parallel to the binder or the matrix forming resin, b. adding a solid blend of the flame retardant and latent hardener composition to the organic material in an intermediate mixing step provided between a storage or a refiner and the board forming steps in a board production line, or c. injecting a liquid aqueous flame retardant and latent hardener composition onto one or more layers of textiles during transfer from a storage and to the board forming station, and where the liquid aqueous flame retardant and latent hardener composition is added prior to and/or in parallel to the binder or the matrix forming resin.

The fire- and/or flame proofing method is thus equally applicable for use in production of boards comprising other organic materials that are glued together as described for the wood-based boards above. Such boards may comprise organic material, such as plant particles such as seeds, husks, shells of nuts or seeds and/or mixtures thereof, e.g. in combination with wood fibers, wood particles and/or wood strands, glued boards comprising one or more layers of textiles or textile fibers, such as woven, knitted, or non-woven textile layers and/or comprising loose textile fibers that are not formed into textiles, resin matrix boards comprising a resin matrix of a board forming resin comprising one or more layers of textile fabrics and/or loose textile fibers, such as woven, knitted or non-woven textile layers and/or comprising loose textile fibers that are not formed into textiles, resin matrix boards comprising a matrix forming resin with dispersed organic material or organic particles such as seeds, husks and/or shells of nuts or seeds, optionally in combination with the above-mentioned wood fibers, wood particles and/or wood strands, or resin matrix boards comprising a matrix forming resin with dispersed fibers and/or particles of wood fibers, wood chips, wood strands, and/or mixtures thereof as already described above.

Resin matrix boards may comprise at least 40% (by weight) of the resin matrix. The resin matrix may be composed of recycled plastic waste, virgin resins and/or mixtures thereof. Such recycled plastic waste often originates from recycled packaging material and thus often comprises of homo or copolymers of polypropylene (PP), polyethylene, polyethylene terephthalate (PET) and/or similar resins commonly use packaging material and/or mixtures thereof. Such resins may however also be applied as virgin resins in the resin matrix boards as homo or copolymers of polypropylene (PP), polyethylene, polyethylene terephthalate (PET) and/or mixtures thereof. The resin matrix is combined with at least 40% (by weight) of the organic material. 1-20% by weight (of solids-based on total solids in the resulting finished resin matrix boards) of the fire retardant composition is applied to the particulate material as a solid or a concentrated liquid composition (as outlined above) prior to mixing with the resin matrix. For example, in an embodiment 5-15% by weight (of solids based on total solids in the resulting resin matrix boards) of the fire-retardant composition is applied to the particulate material is mixed with the organic material prior to mixing with the resin matrix.

In the resin matrix boards the resin forms a contiguous phase with the mixture of organic material/particulates and the flame-retardant composition dispersed in the resin matrix. The inorganic flame-retardant composition is water soluble, and is thus insoluble in the resin matrix. By mixing the flame-retardant composition in solid or liquid form with the organic material it is possible to provide resin composite boards which possess a flame retardant effect is provided to the resulting boards.

When using sheets of textile fabrics as mentioned above, the resin boards may comprise one or more layers thereof disposed within the polymer matrix.

The impregnation with the fire proofing/retarding composition according to embodiments of the present invention of the organic particles or textiles that are embedded in the polymer matrix appear to provide sufficient flame retarding or fireproofing effect on the finished boards to pass fire testing according to EN13501-1:2007, and obtain at least a Euro class D or higher, such as or up to B (B-s1, d0), depending on the overall content of flame retardant composition according to embodiments of the present invention.

Such flame retarded polymeric composite boards are also fully recyclable. The use of the non-toxic flame retardant according to embodiments of the present invention results in that the resin composite boards are fully recyclable and may be reused without any problems arising from addition of well-known toxic flame-retardant compositions.

Aspects of embodiments of the present invention are also met by fire retarded wood based composite boards obtainable by the method as described herein, wherein the wood based composite boards are fiber boards, such as low density fiber boards (LDF), medium density fiber boards (MDF), high density fiber boards (HDF), particle boards (PB), oriented strand boards (OSB), and/or comprising plant particles such as seeds, husks, shells of nuts or seeds or mixtures thereof or glued boards comprising one or more layers of textiles or textile fibers, or resin boards comprising a resin matrix with dispersed fibers and/or particles of wood fibers, wood chips, wood strands, one or more layers of textiles, textile fibers, plant particles such as seeds, husks, shells of nuts or seeds and/or mixtures thereof.

Aspects of embodiments are also met by a method for fireproofing or flameproofing a fiber cement board, wherein the fibers comprise wood based fibers, and where the wood based fibers are passed from a storage and to a mixer for mixing with a cement composition and obtaining a fiber cement premix and wherein the wood based fibres are mixed with a flame retardant composition according to embodiments of the present invention, and wherein the flame retardant composition is provided to the solid fiber cement mix by injecting a liquid aqueous flame retardant composition according to any of the claims 1-5 to a blow line that passes the wood fibers or wood particles from a storage and prior to mixing with the cement composition, and where the liquid aqueous flame retardant composition is added to the blow line in parallel to the binder, or adding a solid blend of the flame retardant composition according to any of the claims 1-5 to the wood fibers or wood particles in an intermediate mixing step prior to mixing the wood fibers with the cement composition.

The aspects of embodiments of the present invention are also met by a fire retarded fiber cement premix obtainable by the method of embodiments of the present invention or a fiber cement composite board prepared from a fire retarded fiber cement premix obtainable by the method according to embodiments of the present invention.

Embodiments of the invention are centered around the use of a flame retardant formulation, in both a water-soluble solution and powder solution, as a combined flame retardant and latent hardener for wood based composite panels: particularly Medium Density Fiber Board (MDF), Particle Board (PB) and related products in which small wood elements are bonded together using an acid catalyzed curing thermosetting resin binder. Related products include High Density Fiberboard (HDF), Low Density Fiberboard (LDF), Oriented Strandboard (OSB), or any wood-based composite boards product in which acid catalyzed curing, thermosetting resin-binders are used.

Embodiments of the invention are particularly applicable for wood based composite board products in which the binder resin used in the wood-based composite board (PB or MDF panel) is one of the common formaldehyde cross-linked types such as Urea-Formaldehyde ("UF"), Melamine Formaldehyde ("MF"), Melamine-Urea Formaldehyde (MUF), Melamine-Urea-Phenol Formaldehyde (MUPF) or any of the known variants in which a latent acid hardener is used for curing of the resin in the hot-pressing stage of board/panel production.

The flame retardant formulation of focus for utilization in embodiments of the invention is based on blends of monophosphate and diphosphate salts of monovalent cations, for example, ammonium salts. In particular, the range of formulations encompassed by the flame retardant composition product range, environmentally friendly, non-toxic water borne/water soluble products are suitable for use. The main product formulations contain blends of di-ammonium hydrogen phosphate (DAP) and monoammonium dihydrogen phosphate (MAP), with optional addition of citric acid and/or water-soluble preservatives such as alkali metal benzoates, salicylates or sorbates.

The flame retardant composition (Burnblock) has been developed as water-soluble/water-borne flame retardant formulations for application in a range of products, including solid wood boards and elements, plywood veneers, wood-based composite boards such as MDF, particle board, OSB and the like, insulation products based on wood and cellulose fibers, as well as textile products.

This flame retardant treatment can be done by post-treatment of the products via the route of spray application onto the finished products, or by vacuum and/or pressure mediated impregnation of the aqueous or solid flame retardant composition into finished panels and products.

However, in the case of wood based composite boards, such as particle board (PB) and medium density fiberboard (MDF), particularly those formed using one of the commonly used formaldehyde cross-linked resin binders such as UF, MF, MUF, MUPF, and known variants of these, in which final cross-linking of the binder, and thereby bonding of the panel, is catalyzed using a latent-acid hardener during hot-pressing, we have discovered that water-soluble flame retardant formulation representatives can readily be applied during the MDF and PB processing operations, and can act both as a latent hardener and also as an effective fire/flame retardant for the finished board, imparting excellent flame retardant characteristics to the products.

More specifically, in the case of MDF production, liquid fire retardant formulations can be applied alongside the liquid resin in the blowline commonly used during MDF production. The blowline is a tube placed at the outlet of the pressurized refiner which, in the MDF production line, converts the wood chips into fibers suitable for MDF. The refiner typically operates at pressures between 4-8 bars and temperatures ranging from 140° C. up to 190° C., and double discs grind the wood chips at these temperatures and pressures to fiber bundles and fibers. The fibers exit the refiner down the blowline tube, and as the pressure externally is equal to atmospheric pressure (i.e. circa 1 bar), the fiber mass travels down the tube at high velocity and with turbulent flow, due to the steep pressure drop. Those skilled in MDF production technology use the blowline as the best position to introduce resin binder, latent hardener, and other additives (ex. wax emulsion) needed in the final panel product. This is done via addition of liquid formulations through injection ports placed along the length of the blowline. It has been discovered that the liquid flame retardant (Burnblock) formulations can also be readily added as an atomized/droplet spray onto the fibers in the blowline, for example, at an injection point adjacent to the resin injection, where hardener is normally added, completely replacing, or partially replacing, the hardener normally used. Other injection points can also be used on the blowline to introduce flame retardant.

In another embodiment, in cases in which blowline blending of resins is not practiced, the flame retardant aqueous liquid formulation can still be added as a replacement for latent hardener and as a flame retardant, normally via spraying into/onto the fiber mass using a suitable fiber and resin-blending device, during or after the initial blending of the resin binder.

In an embodiment, water-soluble flame retardant and latent hardener (Burnblock) formulations suitable for application and use in MDF and PB and other wood based composite panels contain both di-ammonium phosphate ("DAP") and monoammonium phosphate ("MAP"), in ratios ranging from 100% DAP to 50% DAP/50% MAP, for example in the range 95% DAP/5% MAP to 60 DAP/40% MAP; in the range 90% DAP/10% MAP to 70% DAP/30% MAP, or in the range 85% DAP/15% MAP to 75% DAP/25% MAP.

In a further embodiment, the water-soluble flame retardant and latent hardener formulations (Burnblock) can also comprise one or more $C_2$-$C_7$ organic acid, such as citric acid, formic acid, acetic acid, malic acid, tartaric acid, oxalic acid, lactic acid, butyric acid, or strong acids such as hydrochloric acid. Optionally, alkali metal benzoate and/or alkaline metal salicylate and/or alkaline metal sorbate, in particular sodium or potassium salicylate/sorbate/benzoate, may be added to the flame retardant composition as a preservative. When added, Citric acid is present at a level compared to the total solids content of the formulation, ranging from 0.1% up to 15% (w/w), for example, in the range 1.5-5% ratio (on a solids basis). If added, salicylate, sorbates or benzoate is included to a level between 0.1-10%, for example, in the range of 2 and 6% of the total dry solids in the formulation.

In a further embodiment, the water-borne flame retardant and latent hardener formulation (Burnblock) for use in MDF production, for introduction via blowline injection, is prepared as an aqueous solution, with total solids concentrations (weight per volume) of between 20% and 60%, for example, 35%-55%, or 45%-55%.

In another embodiment, for application in particle board and other wood based composites, the typical solids percentage composition for the aqueous liquid flame-retardant and latent hardener formulation is within the same ranges specified for MDF.

In an even further embodiment, for all board types, it is feasible and realistic to use the option to add the flame retardant and latent hardener components as a blended solid mix, via dry blending into the dry particulate or fiber mass using any reasonable mixer or blender as understood by those skilled in the art of wood-based composite production.

In an embodiment, the levels of solids addition to the various panel types derived from addition of the flame retardant to the product range from 15 kg/m$^3$ of finished product up to 100 kg/m$^3$. In a further embodiment, the level of solids addition lies in the range from 25 kg/m$^3$ to 75 kg/m$^3$ to ensure an optimal fire retardant effect and a higher classification on EN13501-1:2007 fire test.

In many cases in which traditional fire/flame retardant is applied to wood based panels such as MDF, Euro Class "D" is usually achieved, after testing of products (using, for example, cone calorimeter test ISO 5660, Single Burning test EN 13823 and classification according to EN 13501-1:2007). In the examples later cited for MDF products, with densities between 650 kg/m$^3$ and 950 kg/m$^3$, produced using the new processing incorporating the water-soluble flame-retardant formulation described in embodiments of the invention, panels achieving Euro-Class B or better have resulted after testing using cone calorimeter test ISO 5660, Single Burning test EN 13823 and classification according to EN 13501-1:2007.

A process in which a flame retardant and latent hardener formulation comprising blends of DAP and MAP, is added to wood fibers and/or particles as part of a panel board fabrication process, alongside a latent acid catalyzed-curing, thermosetting resin binder, and other additives commonly used in wood composite board production, and the mix is then hot-pressed into a finished board, such as particle board ("PB") or Medium Density fiber board ("MDF"). Wherein the flame retardant and latent hardener formulation can fully, or partially, replace the latent acid hardener, as well as functioning as an effective flame-retarding additive.

A process in which the resin binder is one of the commonly used formaldehyde cross-linked, thermosetting binders used in the wood panels industry. Such glues are UF, MF, MUF, MUPF, characterized in that they are finally cured in a hot-press, using a latent acid catalyst or "hardener" as a co-additive.

A process in which the water-borne flame retardant and latent hardener formulation is added to fibers derived from wood via injection in a blowline as part of an mdf production line, in which liquid resin binder is also added in the blowline, such resin being one of the commonly used formaldehyde cross-linked binders used in the wood panels industry. The flame retardant formulation works both as a latent hardener during hot-pressing of the wooden particle board and as an effective flame-retardant in the finished board. The flame-retardant is applied via blowline injection as a liquid aqueous solution of solids contents ranging from 25% w/w to 70% w/w, for example, 35% w/w to 55% w/w.

A process in which the water-borne flame-retardant and latent hardener formulation is added to particles and chips derived from wood using spraying onto the chips at a stage immediately following the addition of resin binder onto the chips, during the standard particle board production sequence. The flame-retardant is applied as a liquid aqueous solution of solids contents ranging from 25% w/v to 70% w/v, for example, 35% w/v to 55% w/v.

A process in which the water-soluble flame-retardant and latent hardener formulation is one of the Burnblock formulations, characterized in that the dissolved solids are substantially blends of DAP and MAP in ratios ranging from 100% DAP to 50% DAP/50% MAP, for example, in the range 95% DAP/5% MAP to 60 DAP/40% MAP; in the range 90% DAP/10% MAP to 70% DAP/30% MAP, or in the range 85% DAP/15% MAP to 75% DAP/25% MAP.

A process for wooden particle board, such as particle board, fiber board or other wood composite board product in which the latent acid catalyzed curing resin binder and the flame-retardant and latent hardener formulations described in preceding claims is added as a dry powder blend to the basic wood elements, before, after or alongside addition of resin binder. The water-soluble flame-retardant formulation is characterized in that is substantially blends of DAP and MAP in ratios ranging from 100% DAP to 50% DAP/50% MAP, for example, in the range 95% DAP/5% MAP to 60 DAP/40% MAP; in the range 90% DAP/10% MAP to 70% DAP/30% MAP, or in the range 85% DAP/15% MAP to 75% DAP/25% MAP.

A process in which the water-soluble flame-retardant and latent hardener formulation used in the wood composite products contain Citric acid and, optionally, alkali metal salicylate, alkali metal benzoate or alkaline metal sorbate as preservative. When added, Citric acid is present at a level, compared to the total solids content of the formulation, ranging from 0.1 up to 15%, for example, in the range 1.5-5% ratio (on a solids basis). If added, sorbate or benzoate is included to a level between 0.1-10%, for example, in the range of 2 and 6% of the total dry solids in the formulation.

A process in which the levels of solids addition to the various panel types derived from addition of the water-soluble flame-retardant and latent hardener to the product range from 15 kg per m$^3$ of finished product up to 100 kg/m$^3$, for example, in the range from 25 kg/m$^3$ to 75 kg/m$^3$.

A process in which the water-borne flame-retardant and latent hardener contains a blend of phosphates including Sodium and Potassium phosphates as well as ammonium phosphates, DAP and/or MAP, in which the Sodium and/or potassium phosphates partially replace either or both of MAP and DAP within the ranges described.

Fire retarded wood-based composite and panel products of varying densities produced, using the MDF processing basis, in which the water-borne flame-retardant added functions as both flame-retardant and hardener for the resin. Board and product densities range from 350 kg per m$^3$ up to 1100 kg per m$^3$ An LDF, MDF or HDF product produced gives products passing flame tests/fire tests (Cone calorimeter test ISO 5660, Single Burning test EN 13823 and classification according to EN 13501-1:200) and resulting in a classification of at least Euro class "D", preferably class "C" or higher.

A wooden particle board product produced gives products passing flame tests/fire tests (Cone calorimeter test ISO 5660, Single Burning test EN 13823 and classification according to EN 13501-1:2007) and resulting in a classification of at least Euro class "D", preferably class "C" or higher.

An OSB product produced gives products passing flame tests/fire tests (Cone calorimeter test ISO 5660, Single Burning test EN 13823 and classification according to EN 13501-1:2007) and resulting in a classification of at least Euro class "D", preferably class "C" or higher.

BRIEF DESCRIPTION

Some of the embodiments will be described in detail, with references to the following Figures, wherein like designations denote like members, wherein:

FIG. 1 depicts a schematic representation of a LDF, MDF and HDF board production plant, including the following elements:
1. Wood logs
2. Debarker
3. Chipper
4. Chip hopper
5. Digester
6. Refiner
7. Resin+Additives
8. Blowline
9. Dryer
10. Cyclone
11. Fiber Conveyord
12. Mat formation and pre-press
13. Continuous hot press
14. Saw
15. Board Cooler
16. Sanding sizing and grading
17. Package
a. Air or fuel gas
b. Solid Material
c. Steam;

FIG. 2 depicts a schematic representation of a Blowline including the following elements:
1. Resin+Additives (e.g. wax, dye, fire-retardant)
2. Inlet pipes to the blowline
3. Blowline; and FIG. 3 depicts a schematic representation of a Pilot plant-Lab-scale equipment for wood composite board production including the following elements:
1. Hopper/Inlet wood fibers
2. Valve to insert wood fibers in the system
3. Industrial Ventilator
4. Spray
5. Loop pipe/Circulation of the fibers
6. Valve to outlet the fibers from the system
7. Collector/Container for Impregnated fibers.

DETAILED DESCRIPTION

Referring to FIGS. 1 and 2, Wood logs (FIGS. 1-1) are debarked (FIGS. 1-2) and then converted into chips mechanically (FIGS. 1-3). The chips are then screw transported (via a chip hopper) (FIGS. 1-4) into a digestion vessel (FIGS. 1-5) and steamed for 30-120 seconds before being fed into a defibrator, which maintains a high pressure and temperature (typically around 8 bars, 180° C. while grinding the wood chips into a pulp. The pulp is released from refiner (FIGS. 1-6) via a tube called the "blowline" into a drier (FIGS. 1-8 and FIG. 2). Because of the pressure drop from circa 8 bars to atmospheric pressure on release into the blowline (FIGS. 2-3), the pulp moves at high speed with very turbulent flow in the blowline, facilitating mixing of components. The blowline is a hence a key component of the fiber board line, and is fitted with a number of injection points/nozzles (FIGS. 2-2) which can introduce additives, such as the fire retardant and liquid (water-based) resin binder into the turbulent mass of fibers ejected from the refiner.

The fire-retardant solution can be inserted as additive in two different ways, in solid and in liquid solution. For 100 kg solid fire-retardant composition, a mix of 15-20 Kg of MAP.

75-80 kg of DAP, 5-10 kg organic acid, in particular citric acid or formic acid, 1-3 kg other additives such as sodium benzoate and/or sodium salicylate will be used. The production of liquid composition requires for 100 kg liquid composition 50 kg solid mix and 50 kg water, resulting in a 50 wt. % concentration.

From the blowline, the fibers enter an expansion chamber and then a flash drier (FIGS. 1-9), in which the fiber mass and additives rapidly dry, wherein moisture content at drier exit is typically 8-12%. The dried mass enters a mat-former (FIGS. 1-12), after which the mat is pre-compressed and either sent straight to a continuous hot press (FIGS. 1-13) or cut into large sheets (FIGS. 1-14) for a multi-opening hot press former. The resin binder is cured during hot-pressing, catalysed by the thermal activation of the latent acid hardener.

Referring to FIG. 3, Pilot system-laboratory-scale production of wood composite boards is shown. For the production of laboratory-scale wood composite boards, a loop device is used as shown in FIG. 3.

In this process, the fibers are inserted into the system by the hopper (FIGS. 3-1) and pass to the system through the inlet valve (FIGS. 3-2). The wood fibers will move through the loop thanks to an industrial ventilator (FIGS. 3-3), which will circulate the fibers through the loop pipes (FIGS. 3-5) at the desired speed. During the circulation of the fibers in the system, the required and previously passed amount of resin and additives, such as fire retardant and/or dye, will be introduced through a spray (FIG. 3-4). When all the spray content is used, the fibers are completely impregnated. At this moment the outlet valve is opened (FIG. 3-6) and the fibers in circulation enter the fiber collector (FIG. 3-7). These fibers are ready for pressing in a standard laboratory press for the production of a wood composite board sample.

EXAMPLES

Example 1

Using a pilot system (as described above and shown at FIG. 3) for resonating and introducing additives to wood fibers suitable for pilot-scale production of MDF or HDF test boards, the following mix was prepared.

TABLE 1

| Material | Concentration (%) | Amount (g) |
|---|---|---|
| Wood Fibers | — | 560 |
| Melamine Urea Formaldehyde (MUF) Resin | 65 | 202 |
| RED Color | 11.5 | 50 |
| Fire retardant blend "Burnblock" | 40 | 101.7 |

The Fire-retardant blend "Burnblock" used contained the following: DAP: 25-35 wt. %; MAP: 2-6 wt. %; Citric Acid: 4-6 wt. %, Sodium Benzoate: 0.5-1 wt. %; Water: 55-60 wt. %. MUF Resin: Water 34-37 wt. %; Melamine-Urea 63-65 wt. %; Formaldehyde <0.20 wt. %. No addition of any other latent hardener catalyst was made.

In the pilot system, blowline blending is simulated as the dry wood fibers are introduced into a steel tube loop and are blown around rapidly using an air flow (max 2.8 m³/h) generated by an industrial ventilator. The liquid additives are introduced via spray nozzles (atomized droplets) into the moving fiber, ensuring even distribution. After 10 minutes or so of circulation, the fiber mass is dry enough, and is discharged from the pilot loop, to enable formation of a fiber mattress ready for placing in a lab-scale hot press. The objective was to produce 8 mm thick test panels, with red color, of density close to 900 kg/m3. The hot-pressing was carried out using press-temperature of 160° C., for 5 minutes, ensuring a core temperature of at least 120° C. was achieved.

Mechanical Properties

Resulting panels had an average density of 991 kg/m³, were of good appearance, even red color and testing according to international standards gave the following results:

TABLE 2

| Properties | | |
|---|---|---|
| Thickness (mm) (≈8) | 7.63 | 0.04 |
| Density (kg/m³) (>850 kg/m³) | 991 | 6.85 |
| Bending | | |
| Flexion (N/mm²) (>34N/mm²) | 53 | 4 |
| Elasticity (N/mm²) (>3000N/mm²) | 3563 | 276 |
| Internal bond | | |
| Internal bond (N/mm²) (>1.3N/mm²) | 1.44 | 0.3 |

Cone calorimeter testing (ISO 5660-1) on the pilot panels indicated a fire classification range for the test pieces of A2/B. Sample P12.

The cone calorimeter is a fire device based on the principle of oxygen consumption during combustion. It is considered the most significant bench scale instrument in fire testing. This apparatus has been adopted by the International Organization for Standardization (ISO 5660-1) for measuring heat release rate (HRR) of a sample.

A fuel sample surface can be radiated with different heat fluxes by this device. The fuel sample ignites and burns in excess air. HRR is based on the fact that the oxygen consumed during combustion is proportional to the heat released. This device analyses the combustion gases and measures the produced smoke from a test specimen that is being exposed to a certain heat flux.

At least the oxygen concentration must be analyzed to calculate the released heat, but to improve the accuracy, carbon monoxide and carbon dioxide concentrations can also be analyzed. The data collected from this bench scale real fire test can be used for fire modelling, prediction of real scale fire behavior, pass/fail tests.

Example 2

Using a pilot system for resonating and introducing additives to wood fibers suitable for pilot-scale production of MDF or HDF test boards, the following mix was prepared.

TABLE 3

| Material | Concentration (%) | Amount (g) |
|---|---|---|
| Wood Fibers | — | 700 |
| MUF Resin | 65 | 252 |
| BLACK Color | 10.5 | 23 |
| Burnblock | 50 | 100.8 |

The Fire-retardant blend "Burnblock" used contained the following: DAP: 30-40 wt. %; MAP: 6-10 wt. %; Citric Acid: 4-6 wt. %; Water: 40-50 wt. %. No addition of any other latent hardener catalyst was made. MUF Resin: Water 34-37 wt. %; Melamine-Urea 63-65 wt. %; Formaldehyde <0.20 wt. %.

| | | | Cone Calorimeter Tests | | | | SBI Prediction | | |
|---|---|---|---|---|---|---|---|---|---|
| Sample ID | Weight (g) | Ignition time (s) | Flame-out (s) | Re-ignition (s) (Spark) | 2nd Flame out (s) | Heat Flux (kW/m2) | Predicted Euroclass (Based on start of test) | Predicted FIGRA (W/s) | Predicted THR (MJ) |
| P12 | 86.79 | 284 | Flaming till end of the test (900 s) | N/A | N/A | 35 | A2/B | 32.2 | 4.3 |
| P22 | 81.05 | 400 | Flaming till end of the test (900 s) | N/A | N/A | 35 | A2/B | 15.6 | 2 |

As described in example 1, a pilot steel loop was used for introduction of liquid components to the fibers. The protocol described therein was followed. The objective was to produce 8 mm thick test panels, with black color, of density close to 900 kg/m3. The hot-pressing was carried out using press-platten temperature of 160° C., for 5 minutes, ensuring a core temperature of at least 120° C. was achieved.

Mechanical Properties—main parameters and achieved properties are shown below

| Properties | | |
|---|---|---|
| Thickness (mm) (≈8) | 8.20 | 0.31 |
| Density (kg/m³) (>850 kg/m³) | 940.0 | 19.3 |
| Bending | | |
| Flexion (N/mm²) (>34N/mm²) | 56 | 4 |
| Elasticity (N/mm²) (>3000N/mm²) | 4130 | 642 |
| Internal bond | | |
| Internal bond (N/mm²) (>1.3N/mm²) | 1.74 | 0.15 |
| Swelling Swelling | | |
| Swelling (%) (<12%) | 10.7% | 3.6% |
| Moisture Moisture | | |
| Moisture (%) (4% to 11%) | 6.1% | 0.1% |

The test panels had an average density of 940 kg/m3, were of even black color and met or exceeded all physical and mechanical property requirements needed for MDF.

Upon fire testing, the product achieved Euro-CLASSIFICATION: A2/B (Cone calorimeter test ISO 5660) Sample P22.

| | | Cone Calorimeter Tests | | | | SBI Prediction | | |
|---|---|---|---|---|---|---|---|---|
| Sample ID | Weight (g) | Ignition time (s) | Flame-out (s) | Re-ignition (s) (Spark) | 2nd Flame out (s) | Heat Flux (kW/m2) | Predicted Euroclass (Based on start of test) | Predicted FIGRA (W/s) | Predicted THR (MJ) |
| P12 | 86.79 | 284 | Flaming till end of the test (900 s) | N/A | N/A | 35 | A2/B | 32.2 | 4.3 |
| P22 | 81.05 | 400 | Flaming till end of the test (900 s) | N/A | N/A | 35 | A2/B | 15.6 | 2 |

Example 3

Use of fire retardant formulation in a full-scale MDF testing using an industrial line as described on FIG. 1, incorporating a multi-injection point blowline for introduction of liquid resin and additives (FIG. 2.).

The Burnblock fire retardant formulation used comprised the following: DAP: 30-40 wt. %; MAP: 6-10 wt. %; Citric Acid: 4-6 wt. %; Water: 40-50 wt. %. MUF Resin: Water 34-37 wt. %; Melamine-Urea 63-65 wt. %; Formaldehyde <0.20 wt. %. No addition of any other latent hardener catalyst was made. The target was production of a black colored MDF panel of 19 mm thickness and density around 850 kg/m³

The operating conditions can be summarized as follows:
19 mm black MDF type panel
PRODUCTION
(m³/h): 5.38

| Required Burnblock Intake (kg/m³) | Burnblock Flow (kg/h) | Burnblock Flow (l/h) | Burnblock Flow (l/min) | Burnblock Flow (l) 60 minutes |
|---|---|---|---|---|
| 30 | 322.80 | 249.7 | 4.16 | 249.65 |

The flame-retardant (which also functioned as latent hardener) was added using the last 2 injection points on the blowline, with resin and dye being added at prior injection points.

| Thickness (mm) | Production (m³/h) | Density of board (kg/m³) | Loading of Resin (solid/dry fiber) | Loading of Dye (solid/dry fiber) |
|---|---|---|---|---|
| 19 | 5.38 | 820 | 30.3 | 2.36 |

Mechanical Properties—main parameters and achieved properties are shown below.

The panel was of even black color and had properties which passed all of the international mechanical property test criteria required for such products.

TABLE 4

| Resume tests for 19 mm black Panels | | |
|---|---|---|
| Parameters | Average | S.D. |
| Properties | | |
| Thickness (mm) | (19 ± 0.2) | 19.15 | 0.02 |
| Density (kg/m³) | (>820 kg/m³) | 761.1 | 6.4 |

TABLE 4-continued

| Resume tests for 19 mm black Panels | | |
|---|---|---|
| Bending | | |
| Flexion (N/mm²) | (>30N/mm²) | 51 | 2.6 |
| Elasticity (N/mm²) | (>2700N/mm²) | 4257 | 235 |
| Internal bond | | |
| Internal bond (N/mm²) | (>0.95N/mm²) | 1.20 | 0.05 |
| Swelling in thickness | | |
| Swelling (%) | (<8%) | 5.75 | 0.29 |

TABLE 4-continued

Resume tests for 19 mm black Panels

Moisture

| | | | |
|---|---|---|---|
| Moisture | (4% to 11%) | 6.1 | 0.1 |
| Formaldehyde class E1 (≤8.0 mg/100 g oven dry board) | | | |
| Corrected to 6.5% moisture content | | 6.4 | |
| Durability-Internal bond (EN 321) | | | |
| Internal bond (N/mm$^2$) | (>0.20N/mm$^2$) | 0.38 | 0.03 |
| Durability-Swelling in thickness (EN 321) | | | |
| Swelling (%) | (<15%) | 6.12 | 0.20 |
| Reaction to fire (EN 13501-1:2017)-CLASSIFICATION | | | |
| According to | EN 13823 | B-s1,d0 | |

| PARAMETER | AVERAGE VALUE |
|---|---|
| FIGRA 0.2 MJ (W/s) | 87.03 |
| FIGRA 0.4 MJ (W/s) | 87.03 |
| THR600s (MJ) | 7.27 |
| SMOGRA (m$^2$/s$^2$) | 74.70 |
| TSP6005 (m$^2$] | 5.10 |
| LFS (Y/N) | No |
| drops/particles flamed (Y/N) | No |
| TSP600s (m$^2$) corrected | 49.24 |
| SMOGRA (m$^2$/s$^2$) corrected | 3.67 |
| FIGRA 0.2 MJ (W/s) | 87.03 |
| FIGRA 0.4 MJ (W/s) | 87.03 |
| THR600s (MJ) | 7.27 |
| SMOGRA (m$^2$/s$^2$) | 74.70 |
| TSP600s (m$^2$) | 5.10 |
| LFS (Y/N) | No |
| drops/particles flamed (Y/N) | No |
| TSP600s (m$^2$) corrected | 49.24 |
| SMOGRA (m$^{2/}$s$^2$) corrected | 3.67 |

The fire testing according to EN13501-1:2007, shown above confirmed that the panel achieved Euro class B (B-s1, d0).

Fire Test According to EN13501-1:2007

One sample is tested, formed from two wings (short wing and long wing), 495 mm×1500 mm and 1000 mm×1500 mm and corresponding thickness, forming a corner where a fire is caused in standard conditions.

The specimens are conditioned to 23° C.+/−2° C. and a relative humidity of 50%+/−5%, according to the standard UNE-EN 13238:11, either by a fixed period of time, either to constant weight.

The tests are performed in the equipment called SBI (Single Burning Item), which consists of a test chamber, a test apparatus (sample holder cart, burner, frame, hood, collector, and ducting), and the smoke extraction system and team general measures.

The test principle is to have the two wings of the test material in a vertical position in right angle so that they are exposed to a burner located in the lower corner (main burner). The flames are obtained by combustion of propane gas, injected through a sand bed with an output power (30.7+/−2.0) kW.

The behavior of the sample is evaluated over a period of 20 minutes, determining performance parameters such as heat emission, smoke production, lateral spread of flame and drop inflamed particles.

A short time before the main burner ignition is used to quantify heat and smoke produced only by the burner, using an identical burner away from the sample and called auxiliary burner.

Measurements are taken either automatically or by visual observation. The extraction pipe is equipped with temperature sensors for measuring the attenuation of light, the molar fraction of oxygen and carbon dioxide, and the flow induced by the pressure difference in the canal. These amounts are recorded automatically and used to calculate the volume flow, the energy release (HRR) and smoke production rate (SPR).

The main visual observations are: lateral spread of flame and drops in flames.

So, as the test results are determined/calculated:

FIGRA 0.4 MJ (W/s): Maximum value of coefficient of heat release rate for the sample and □the moment is started, using a threshold THR (amount of heat evolved) of 0.4 MJ.

THR 600 s (MJ): Total amount of heat released from the sample in the first 600 seconds of the start of exposure to the main burner.

SMOGRA (m2/s2): Smoke production rate. Maximum value of the ratio of the speed of production of smoke by the sample and the time during which it is produced.

TSP 600 s (m2): Total production smoke of the sample in the first 600 seconds of the start of exposure of main burner flames.

LSF edge: Lateral flame spread along the long wing of the sample.

Droplets or flamed particles with inflammation times higher or lower than 10 seconds.

According to Table 1 in "Fire classification on construction products and building elements Part 1: Classification using test data from reaction to test fire tests", EN 13501-1:2007.

| | Main classification | Smoke classification | | Flaming droplets/particles classification |
|---|---|---|---|---|
| A2 and B | FIGRA$_{0.2MJ}$ ≤ 120 W/s LFS < specimen edge THR$_{600s}$ ≤ 7.5 MJ | s1 | SMOGRA ≤ 30 m$^2$/s$^2$ TSP$_{600s}$ ≤ 50 m$^2$ | d0 No flaming droplets/part. |
| C | FIGRA$_{0.4MJ}$ ≤ 250 W/s LFS < specimen edge THR$_{600s}$ ≤ 15 MJ | s2 | SMOGRA ≤ 180 m$^2$/s$^2$ TSP$_{600s}$ ≤ 200 m$^2$ | d1 No flaming droplets/part. persisting > 10 s |
| D | FIGRA ≤ 750 W /s | s3 | — | d2 — |

Example 4

Gel Time/Hardener Effect:

Gel time tests have been carried out for MUF resin using different hardener/fire retarder sample compositions according to embodiments of the present invention and reference hardeners.

Sample compositions were made by mixing the components mentioned in table 5 with water in the prescribed weight percentage:

TABLE 5 sample compositions of hardener/
fireproofers used in gel time tests.

| Exp No. | Diammonium Phosphate (wt. %) | Monoammonium Phosphate (wt. %) | Citric Acid (wt. %) | Water (wt. %) |
|---|---|---|---|---|
| Sample 1 | 38.0 | 8.0 | 4.0 | 50.0 |
| Sample 2 | 26.0 | 20.0 | 4.0 | 50.0 |
| Sample 3 | — | 46.0 | 4.0 | 50.0 |
| Sample 4 | 30.0 | 16.0 | 4.0 | 50.0 |

To perform the gel time tests, the Melamine Urea Formaldehyde (MUF) resin was mixed with different hardener/fire retarder compositions.

The mixing was performed under continuous agitation while heating the sample using a water bath at 100° C. The times for gelation have been measured and the results can be shown in the following table (table 6).

TABLE 6 gelation time for MUF using the hardener/fireproofing
composition or reference hardeners or fireproofers.

| Exp. Nr. | Amount Resin MUF | Type of hardener/fire proofer | Amount of hardener/fire proofer | Total Volume of the same (g) | Gel time (sec) |
|---|---|---|---|---|---|
| 1 | 80% | Sample 1 | 20% | 50 | >300 |
| 2 | 80% | Sample 2 | 20% | 50 | –270 |
| 3 | 80% | Sample 3 | 20% | 50 | –280 |
| 4 | 80% | Sample 4 | 20% | 50 | –300 |
| 5 | 80% | Sample 1 | 20% | 25 | –250 |
| 6 | 80% | Sample 2 | 20% | 25 | 210 |
| 7 | 80% | Sample 3 | 20% | 25 | 226 |
| 8 | 90% | Sample 1 | 10% | 25 | 220 |
| 9 | 90% | Sample 2 | 10% | 25 | 140 |
| 10 | 100% | — | — | 25 | >86400 |
| 11 | 48 g/96% | MAP | 2 g/4% | 50 | 80 |

Conclusions on Gelling Examples:

A decrease in the amount of water added during the gel-time process produces a considerable increase in the curing of the resin.

An increase in the amount of MAP in the sample increases the cure rate of the resin.

It has been proved that Sample 1, 2, 3 and 4 all have a hardener effect on the MUF resin.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A method for fireproofing or flameproofing wood composite boards selected from the group including medium or high density fiber boards or particle boards, during production of the boards, in which wood fibers or wood particles are passed from a storage and to a press via a blow line, and wherein a binder is added to the wood fibers or wood particles by mixing the binder into the fiber or wood particles by injecting, spraying or blending the binder into fiber or particle mix, in the blow line, resin blending or resin mixing chamber, and subsequently pressing the blend in a press to obtain the final wood composite board, and wherein the method further comprises adding a flame-retardant composition to the wood fibers or wood particles, by
   a. injecting a liquid aqueous flame-retardant and latent hardener composition comprising a blend of diammonium hydrogen phosphate (DAP) and monoammonium dihydrogen phosphate (MAP),
   wherein the blend of DAP and MAP in weight ratios ranges from 95% DAP/5% MAP to 60% DAP/40% MAP, and from 0.1 up to 15% by weight of total solids of one or more acids selected from the group consisting of organic acid, C2-C7 organic acid, citric acid, formic acid, acetic acid, malic acid, tartaric acid, oxalic acid, lactic acid, butyric acid, strong acid, hydrochloric acid, and any mixtures thereof, the liquid composition being an aqueous composition comprising a liquid aqueous solution of the contents ranging from 25% w/w to 80% w/w of the blend, to the blow line that passes the wood fibers or wood particles from the storage and to the press, and where the liquid aqueous flame-retardant composition is added to the blow line in parallel to the binder, or
   b. adding a solid blend of the flame-retardant and latent hardener composition comprising a blend of DAP and MAP, wherein the blend of DAP and MAP in weight ratios ranges from 95% DAP/5% MAP to 60% DAP/40% MAP, and from 0.1 up to 15% by weight of total solids of one or more acids selected from the group consisting of organic acid, C2-C7 organic acid, citric acid, formic acid, acetic acid, malic acid, tartaric acid, oxalic acid, lactic acid, butyric acid, strong acid, hydrochloric acid, and any mixtures thereof, to the wood fibers or wood particles, parallel to the binder, in an intermediate mixing step provided between a refiner and the forming and hot-pressing steps in board production.

2. The method for fireproofing or flameproofing wood composite boards according to claim 1, wherein the binder used in the board is a thermosetting resin binder, that is cured by an acid catalyst, and wherein the thermosetting resin comprises a resin selected from a formaldehyde cross-linked resin binder, Urea Formaldehyde, Melamine Formaldehyde, Melamine Urea Formaldehyde, Melamine Urea Phenol Formaldehyde, and mixtures thereof, and where the mix of resin and wood fibers or wood particles are cured in a hot-press.

3. The method for fireproofing or flameproofing wood composite boards according to claim 2, wherein the acid catalyst is provided by the flame-retardant composition.

4. The method for fireproofing or flameproofing wood composite boards according to claim 1, wherein the flame-retardant and latent hardener composition is added to the wood fibers or particles in an amount corresponding to from 15 kg per m3 of finished product up to 100 kg/m3.

5. A method for fireproofing or flameproofing particle boards or oriented strand boards during production of the boards, in which wood particles or strands are passed from a storage and to a press via a resin mixing or blending chamber, which can be a resin blending section at the end of a rotary drier, and wherein a binder is added to the wood particles by mixing the binder into the particles or particles by injecting the binder and subsequently pressing the blend in the press to obtain the final wood composite board, and wherein the method further comprises adding a flame-retardant composition to the wood fibers or wood particles, by a. injecting a liquid aqueous flame-retardant and latent hardener composition comprising a blend of diammonium hydrogen phosphate (DAP) and monoammonium dihydrogen phosphate (MAP), wherein the blend of DAP and MAP in weight ratios ranges from 95% DAP/5% MAP to 60% DAP/40% MAP, and from 0.1 up to 15% by weight of total solids of one or more acids selected from the group consisting of organic acid, C2-C7 organic acid, citric acid, formic acid, acetic acid, malic acid, tartaric acid, oxalic acid, lactic acid, butyric acid, strong acid, hydrochloric acid, and any mixtures thereof, the liquid composition being an aqueous composition comprising a liquid aqueous solution of the contents ranging from 25% w/w to 80% w/w of the blend into the resin blender or resin blending section of a drier that transfers the wood fibers or wood particles from the storage and to the press, and where the liquid aqueous flame-retardant and latent hardener composition is added in parallel to the binder, or b. adding a solid blend of the flame-retardant and latent hardener composition comprising a blend of DAP and MAP, wherein the blend of DAP and MAP in weight ratios ranges from 95% DAP/5% MAP to 60% DAP/40% MAP, and from 0.1 up to 15% by weight of total solids of one or more acids selected from the group consisting of organic acid, C2-C7 organic acid, citric acid, formic acid, acetic acid, malic acid, tartaric acid, oxalic acid, lactic acid, butyric acid, strong acid, hydrochloric acid, and any mixtures thereof, to the wood fibers or wood particles in an intermediate mixing step provided between a refiner and the forming and hot-pressing steps in board production.

6. A method for fireproofing or flameproofing boards made with organic material/materials, fibers or particles selected from the group of wood fibers, wood particles, wood strands, plant particles and material selected from seeds, husks, straw, shells of nuts or seeds or mixtures thereof or glued boards comprising one or more layers of textiles or textile fibers, or resin boards comprising a resin matrix with dispersed fibers and/or particles of wood fibers, wood chips, wood strands, one or more layers of textiles, textile fibers, plant particles selected from seeds, husks, shells of nuts or seeds and/or mixtures thereof, wherein a fireproofing or flameproofing composition is induced to the organic material during production of the boards, in which organic material is passed from a storage and to a board forming station via a resin mixing or blending chamber, which can be a resin blending section at the end of a rotary drier, and wherein a binder or a matrix forming resin is added to the organic material by mixing the binder or resin into the organic material by injecting the binder or resin and subsequently forming the blend into boards to obtain the final composite board containing the organic material, and wherein the method further comprises adding a flame-retardant composition to the organic material, by a. injecting a liquid aqueous flame-retardant and latent hardener composition comprising a blend of diammonium hydrogen phosphate (DAP) and monoammonium dihydrogen phosphate (MAP), wherein the blend of DAP and MAP in weight ratios ranges from 95% DAP/5% MAP to 60% DAP/40% MAP, and from 0.1 up to 15% by weight of total solids of one or more acids selected from the group consisting of organic acid, C2-C7 organic acid, citric acid, formic acid, acetic acid, malic acid, tartaric acid, oxalic acid, lactic acid, butyric acid, strong acid, hydrochloric acid, and any mixtures thereof, the liquid composition being an aqueous composition comprising a liquid aqueous solution of the contents ranging from 25% w/w to 80% w/w of the blend, into the organic material and where the liquid aqueous flame-retardant and latent hardener composition is added prior to and/or in parallel to the binder or the matrix forming resin, b. adding a solid blend of the flame-retardant and latent hardener composition comprising a blend of DAP and MAP, wherein the blend of DAP and MAP in weight ratios ranges from 95% DAP/5% MAP to 60% DAP/40% MAP, and from 0.1 up to 15% by weight of total solids of one or more acids selected from the group consisting of organic acid, C2-C7 organic acid, citric acid, formic acid, acetic acid, malic acid, tartaric acid, oxalic acid, lactic acid, butyric acid, strong acid, hydrochloric acid, and any mixtures thereof, to the organic material in an intermediate mixing step provided between the storage or a refiner and the board forming steps in a board production line, or c. injecting the liquid aqueous flame-retardant and latent hardener composition onto one or more layers of textiles during transfer from the storage and to the board forming station, and where the liquid aqueous flame-retardant and latent hardener composition is added prior to and/or in parallel to the binder or the matrix forming resin.

\* \* \* \* \*